United States Patent Office 3,019,246
Patented Jan. 30, 1962

3,019,246
17α-METHYL-9α-FLUORO-Δ¹-ANDROSTENE-17β-OL-3-ONE DERIVATIVES
George Rosenkranz, Mexico City, Mexico, assignor to Syntex, S.A., Mexico City, Mexico, a corporation of Mexico
No Drawing. Filed Sept. 4, 1959, Ser. No. 838,064
Claims priority, application Mexico Sept. 6, 1958
5 Claims. (Cl. 260—397.45)

The present invention relates to certain new cyclopentanoperhydrophenanthrene derivatives.

More particularly, it relates to the production of 17α-methyl-9α-fluoro-Δ¹-androsten-17β-ol-3-one oxygenated at C-11 with a keto or β-hydroxyl group, as well as to their 17-esters formed with a hydrocarbon carboxylic acid having up to about 12 carbon atoms. These new compounds have the general formula:

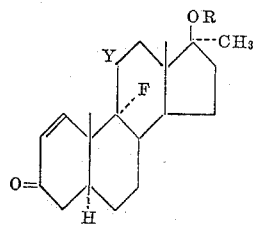

in which Y is an arrangement selected from the group consisting of =O and

and R is a member of the group consisting of hydrogen and acyl radicals derived from a hydrocarbon carboxylic acid having up to about 12 carbon atoms. Such novel compounds are potent anabolic, androgenic and anti-estrogenic agents.

As starting material for the production of these new compounds there is used 17α-methyl-9α-fluoro-5α-androstane-11β,17β-diol-3-one, the preparation of which is described in Patent No. 2,806,863.

The process for producing the new compounds can be illustrated by the following reaction diagram:

REACTION DIAGRAM

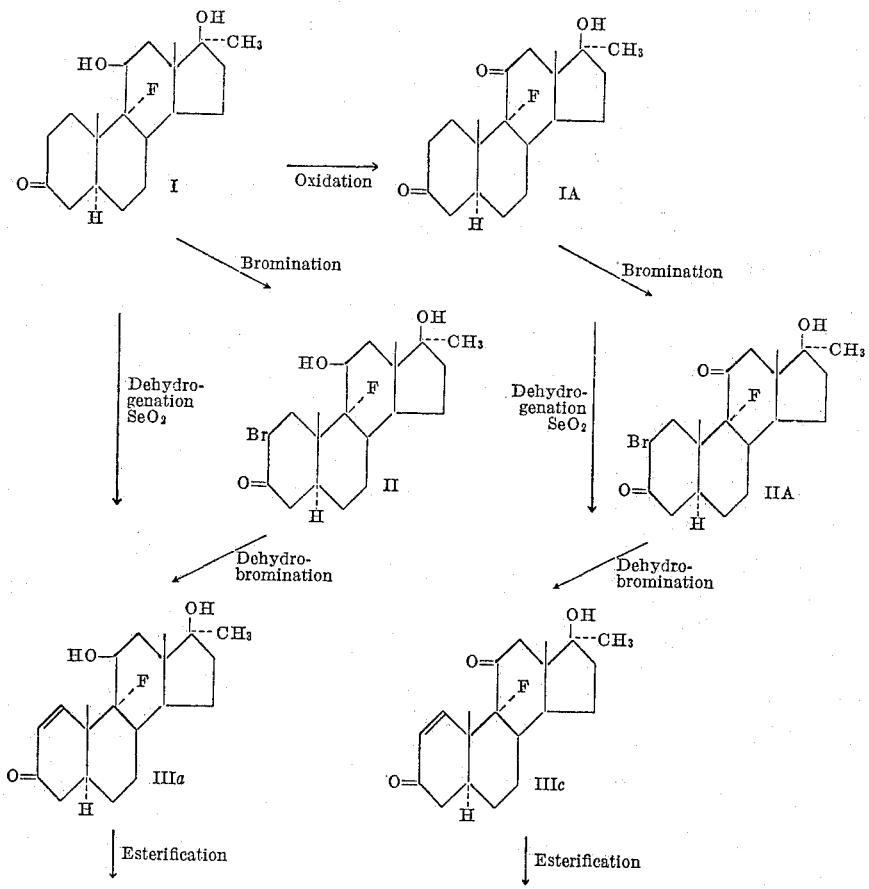

REACTION DIAGRAM—Continued

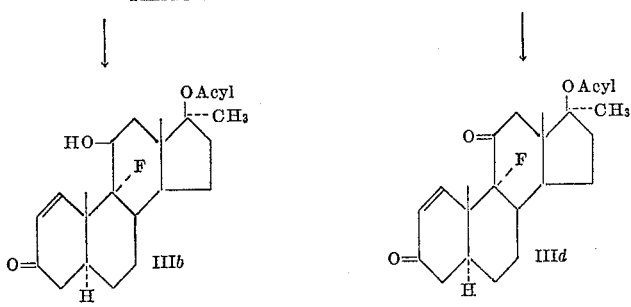

Monobromination of the aforementioned starting compound (I) preferably by reaction in acetic acid solution with one molar equivalent of bromine in the presence of sodium acetate, leads to the intermediate 17α-methyl-2-bromo - 9α - fluoro - androstane-11β,17β-diol-3-one (II). The latter is dehydrobrominated by refluxing with a tertiary amine such as collidine or by heating with calcium carbonate in mixture with dimethylacetamide, thereby yielding 17α-methyl-9α-fluoro-Δ¹-androstene-11β,17β-diol-3-one (IIIa), the 17-hydroxyl group of which is then esterified by reaction with the anhydride of hydrocarbon carboxylic acid having up to about 12 carbon atoms, preferably by heating the steroid with such anhydride in the presence of pyridine for a prolonged period of time at temperatures around 100° C., thus forming the respective 17-esters of 17α-methyl-9α-fluoro-Δ¹-androstene-11β,17β-diol-3-one (IIIb).

Optionally, the free Δ¹ compound (III) can be obtained by refluxing the starting compound (I) with selenium dioxide in mixture with t-butanol, in the presence of small amounts of water, acetic acid or a basic catalyst such as pyridine, preferably under an atmosphere of nitrogen.

The preparation of 17α-methyl-9α-fluoro-Δ¹-androsten-11β-ol-3,11-dione and its esters is achieved by first oxidizing the 11β-hydroxyl group of I to the keto group by reaction with chromic acid in mixture with aqueous acetic acid, or by treating an acetone solution of starting compound I with an 8 N solution of chromic acid, which solution is prepared by dissolving chromium trioxide in dilute sulfuric acid. The double bond between C–1 and C–2 is then introduced into the resulting 17α-methyl-9α-fluoro-androstan-17β-ol-3,11-dione (IA) of the two methods as mentioned above, that is, either by bromination at C–2 followed by dehydrobromination, or by reaction with selenium dioxide. Thus there is produced 17α-methyl-9α-fluoro-Δ¹-androsten-17β-ol-3,11-dione (IIIc), the esters of which can then be obtained by the above mentioned conventional method of esterification.

For the esterification of the 17β-hydroxyl group of 17α-methyl-9α-fluoro-Δ¹androstene-11β,17β-diol-3-one and of 17α-methyl-9α-fluoro-Δ¹-androsten-17β-ol-3,11-dione (IIIa and IIIc), there can be used the anhydrides of carboxylic acids having up to about 12 carbon atoms, saturated or unsaturated, of straight, branched, chain or cyclic or mixed aliphatic-cylic compounds, which may be substituted with functional groups such as methoxy, halogen or other groups. Among the esters of such acids there were prepared the acetates, propionates, butyrates, hemisuccinates, caproates, enanthates, benzoates, trimethylacetates, cyclopentylpropionates, phenoxyacetates, phenylpropionates and β-chloropropionates.

To those skilled in the art it is obvious that the reactions described in particular in the following examples can be modified within wide limits, both with respect to the reagents and solvents employed as with respect to the reaction conditions.

Also, the order of the process steps can be varied; thus, the hydroxyl group at C–17β can already be esterified either in the starting material (I or IA) or in the 2-bromo derivatives (II or IIA), so that by the subsequent reactions there are obtained the 11-oxygenated 17α-methyl-9α-fluoro-Δ¹-androsten-17β-ol-3-ones under the form of their 17-esters. The oxidation of the 11β-hydroxyl group to the 11-keto group can be carried out with 17α-methyl-9α-fluoro-Δ¹-androstene-11β,17β-diol-3-one or its 17-esters, preferably in acetone solution by treatment with 8 N chromic acid.

The following examples serve to illustrate the invention but are not intended to limit the scope of the same.

Example I

To a mixture of 5 g. of 17α-methyl-9α-fluoro-androstane-11β,17β-diol-3-one prepared as described in Patent No. 2,806,863, and 200 cc. of acetic acid there was added gradually and under stirring a mixture of 2.4 g. of bromine in 50 cc. of acetic acid containing 1.4 g. of anhydrous sodium acetate, while the temperature of the mixture was maintained at about 15° C. After the entire bromine had been added, the mixture was stirred for a further half hour at room temperature; it was then diluted with ice water until complete precipitation of the bromination product consisting of 17α-methyl-2-bromo-9α-fluoro-androstene-11β,17β-diol-3-one (II) was achieved; the precipitate was collected, washed with water and dried under vacuum; the product was used for the next step without further purification; in another experiment, the pure compound was obtained by low temperature crystallization from chloroform.

The above mentioned crude compound was suspended in 100 cc. of dimethylacetamide, mixed with 3 g. of calcium carbonate and refluxed for 30 minutes; after concentrating the suspension to a volume of about 40 cc. under reduced pressure, the residue was cooled and poured into dilute hydrochloric acid solution. The precipitate was collected by filtration, washed with water, dried and recrystallized from acetone-hexane. There was thus obtained 17α-methyl-9α-fluoro-Δ¹-androstene-11β,17β-diol-3-one (IIIa).

Example II

A mixture of 5 g. of crude 17α-methyl-2-bromo-9α-fluoro-androstane-11β,17β-diol-3-one (II), prepared in accordance with the method of the previous example, and 30 cc. of γ-collidine was refluxed for 2 hours and then cooled; the resulting precipitate of collidine hydrobromide was filtered and washed with ether, whereupon the ether washings and the collidine were combined and diluted with more ether and water; an organic layer formed which was separated and consecutively washed with dilute hydrochloric acid, water, 5% sodium carbonate solution and finally again with water to neutral. The ether solution was then dried over anhydrous sodium sulfate, and the ether was evaporated. The residue crystallized from acetone-hexane to furnish 17α-methyl-9α-fluoro-Δ¹-androstene-11β,17β-diol-3-one, identical with the product obtained in accordance with the method of Example I.

Example III

A mixture of 5 g. of 17α-methyl-9α-fluoro-androstane-11β,17β-diol-3-one, 100 cc. of t-butanol, 2 g. of selenium dioxide and a few drops of pyridine was refluxed for 48 hours under an atmosphere of nitrogen and then filtered through celite, while washing the filter with a little hot ethyl acetate. The combined filtrate and washings were evaporated to dryness under reduced pressure, the residue was refluxed in acetone solution for 1 hour with decolorizing charcoal, the charcoal was filtered off and the acetone was evaporated from the filtrate, ultimately under reduced pressure. The obtained residue was purified by chromoatography on neutral alumina, thus yielding 17α-methyl-9α-fluoro-Δ¹-androstene-11β,17β-diol-3-one (IIIa), identical wtih the product obtained by the method of Example I.

Example IV

To a mixture of 5 g. of 17α-methyl-9α-fluoro-androstane-11β,17β-diol-3-one and 100 cc. of 90% acetic acid there was added a solution of 1.2 g. of chromium trioxide in 20 cc. of a mixture of equal parts of glacial acetic acid and water. The chromium trioxide solution was slowly added to the stirred mixture while maintaining the temperature below 15° C. The resulting mixture was stirred at room temperature for one more hour and was then poured into ice water; the formed precipitate was collected, washed with water, dried and recrystallized from acetone-hexane, thus yielding 17α-methyl-9α-fluoro-androsten-17β-ol-3,11-dione (IA).

5 g. of the above compound was then dehydrogenated by the reaction with selenium dioxide as described in the previous example. There was thus obtained 17α-methyl-9α-fluoro-Δ¹-androsten-17β-ol-3,11-dione (IIIc).

Example V 5 g. of 17α-methyl-9α-fluoro-androstan-17β-ol-3,11-dione (IA), prepared as described in Example IV, was subjected to monobromination at C-2, followed by dehydrobromination, in accordance with the methods described in Examples I and II. There was thus obtained 17α-methyl-2-bromo-9α-fluoro-androstan-17β-ol-3,11-dione (IIA) and then 17α-methyl-9α-fluoro-Δ¹-androsten-17β-ol-3,11-dione (IIIc) identical with the product obtained in accordance with the method of Example IV.

Example VI

A mixture of 1 g. of 17α-methyl-9α-fluoro-Δ¹-androstene,11β,17β-diol, obtained as the final compound as described in Examples I, II and III, with 5 cc. of pyridine and 5 cc. of acetic anhydride was heated for 8 hours at a temperature in the vicinity of 100° C. The mixture was then poured into water, heated for half an hour on the steam bath and cooled, and the formed precipitate was collected, washed with water, dried and recrystallized from acetone-hexane. There was thus obtained 17α-methyl-9α-fluoro-Δ¹-androstene-11β,17β-diol-3-one 17-acetate (IIIb).

Example VII

By following the method of the previous example, 1 g. of 17α-methyl-9α-fluoro-Δ¹-androsten-17β-ol-3,11-dione (IIIc) was treated with 5 cc. of propionic anhydride and 5 cc. of pyridine for 8 hours, thus producing 17α-methyl-9α-fluoro-Δ¹-androsten-17β-ol-3,11-dione 17-propionate (IIId).

Example VIII

Examples VI and VII were repeated; however, there were substituted for the anhydrides mentioned therein other anhydrides of the type specified hereinbefore to produce the corresponding 17-esters of 17α-methyl-9α-fluoro-Δ¹-androstene-11β,17β-diol-3-one and of 17α-methyl-9α-fluoro-Δ¹-androsten-17β-ol-3,11-dione, respectively. Among others there were prepared the esters listed below with the aid of the cited acid anhydrides:

| Free Compound Produced According to Example— | Acid Anhydride | Resulting Ester |
|---|---|---|
| (a) | I | isobutyric anhydride | 17α-methyl-9α-fluoro-Δ¹-androstene-11β,17β-diol-3-one 17-isobutyrate. |
| (b) | IV | caproic anhydride | 17α-methyl-9α-fluoro-Δ¹-androsten-17β-ol-3,11-dione 17-caproate. |
| (c) | II | benzoic anhydride | 17α-methyl-9α-fluoro-Δ¹-androstene-11β,17β-diol-3-one 17-benzoate. |
| (d) | IV | cyclopentyl-propionic anhydride | 17α-methyl-9α-fluoro-Δ¹-androsten-17β-ol-3,11-dione 17-cyclopentyl-propionate. |
| (e) | I | enanthic anhydride | 17α-methyl-9α-fluoro-Δ¹-androstene-11β,17β-diol-3-one 17-enanthate. |

When the esterification was effected with the anhydride of a polycarboxylic acid then the amount of anhydride was increased proportionally and the reaction time was prolonged to 48 hours.

I claim:

1. A Δ¹-androsten derivative having the general formula:

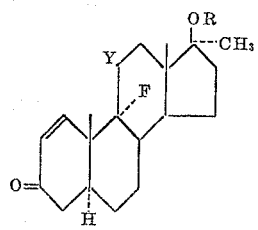

in which R is a member of the group consisting of hydrogen and of acyl radicals derived from hydrocarbon carboxylic acids having up to 12 carbon atoms, and Y is an arrangement selected from the group consisting of =O and

2. 17α-methyl-9α-fluoro-Δ¹-androstene-11β,17β-diol-3-one.

3. A 17-ester of the compound described in claim 2 the acid radical of which is derived from a hydrocarbon carboxylic acid having up to 12 carbon atoms.

4. 17α-methyl-9α-fluoro-Δ¹-androsten-17β-ol-3,11-dione.

5. A 17-ester of the compound described in claim 4 the acyl radical of which is derived from a hydrocarbon carboxylic acid having up to 12 carbon atoms.

References Cited in the file of this patent

UNITED STATES PATENTS

| | | |
|---|---|---|
| 2,793,218 | Herr | May 21, 1957 |
| 2,806,863 | Herr | Sept. 17, 1957 |
| 2,813,883 | Herr | Nov. 19, 1957 |
| 2,836,607 | Agnello et al. | May 27, 1958 |
| 2,842,573 | Herr et al. | July 8, 1958 |
| 2,877,158 | Agnello et al. | Mar. 10, 1959 |
| 2,885,412 | Hirschmann et al. | May 5, 1959 |